April 30, 1968     W. WINGEN     3,380,700
PARALLELOGRAM-TYPE SPRING ARRANGEMENT FOR SEAT CUPS
Filed Dec. 21, 1965     2 Sheets-Sheet 1
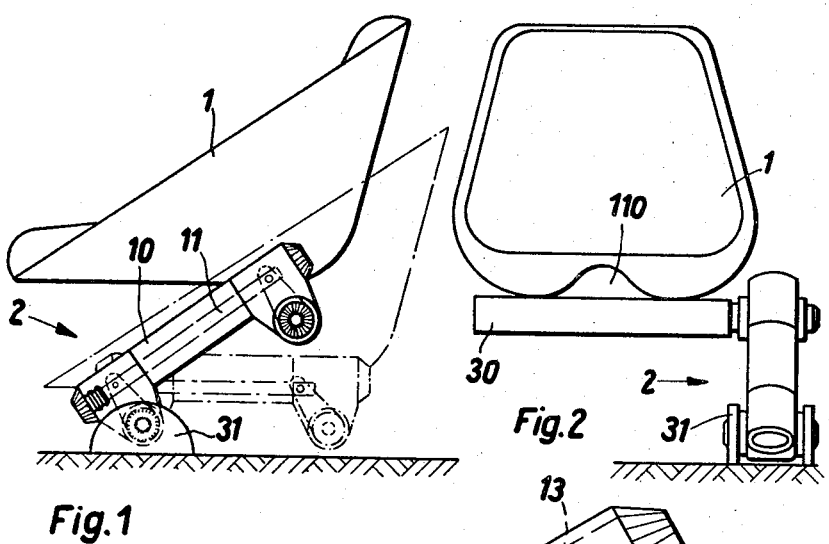
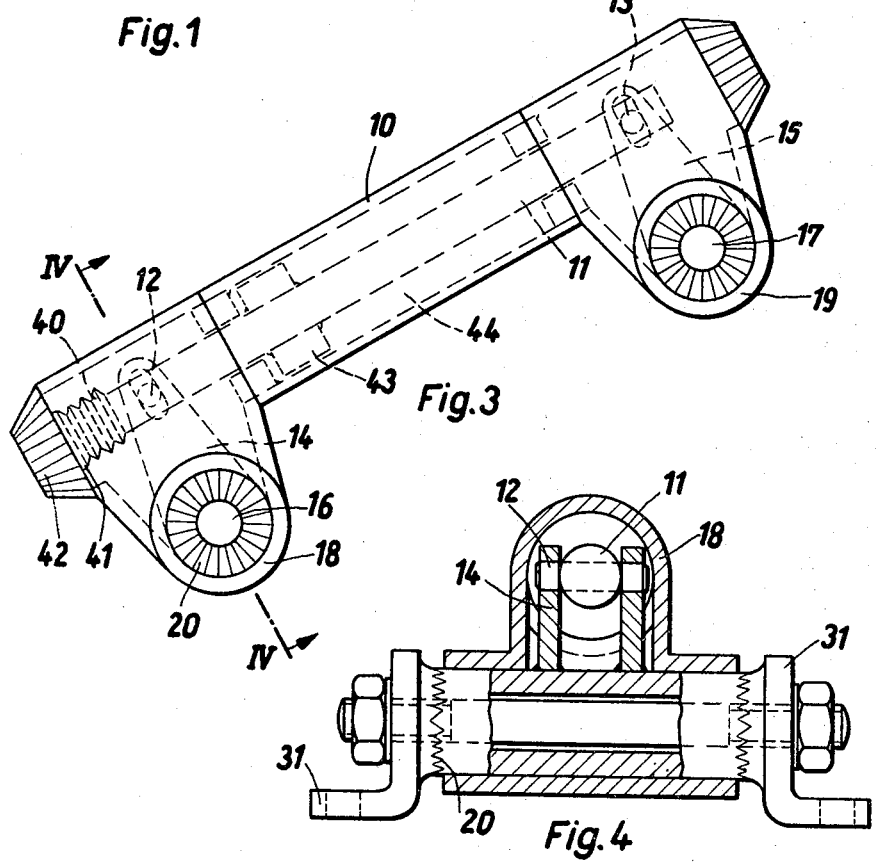
Inventor:
WILHELM WINGEN
BY Thomas ... 
ATTORNEY

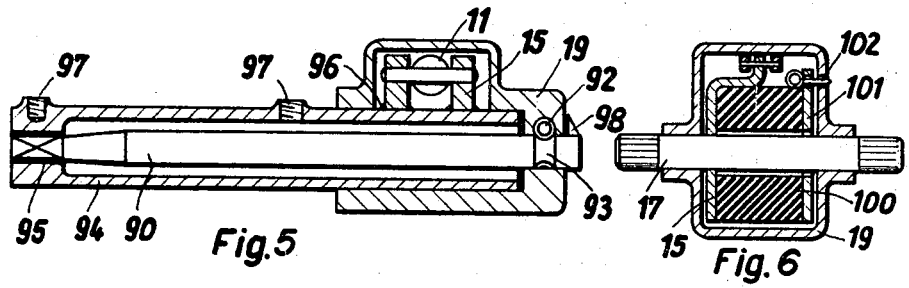

United States Patent Office 3,380,700
Patented Apr. 30, 1968

3,380,700
PARALLELOGRAM-TYPE SPRING ARRANGE-
MENT FOR SEAT CUPS
Wilhelm Wingen, Munich, Germany, assignor to Rupert
Fritzmeier, Grosshelfendorf Luber, Munich, Germany
Filed Dec. 21, 1965, Ser. No. 515,311
Claims priority, application Germany, Dec. 23, 1964,
F 44,798
7 Claims. (Cl. 248—399)

ABSTRACT OF THE DISCLOSURE

A vehicle saddle is supported at one end on a torsion spring, mounted at one end on a supporting spring, of parallelogram form, which, in turn is mounted at one end on the base, to give a spring supported saddle, held level under load.

---

The invention relates to a parallelogram-type spring arrangement for seat cups, or saddles, in particular as used on agricultural vehicles, tractors and like heavy duty vehicles.

The seat cups with known parallelogram-type spring arrangements have two parallelogram levers with the necessary swing levers and springings, resulting in a relatively spaceous supporting structure for the seat. Besides, one great disadvantage of such parallelogram-type spring arrangements is that considerable difficulties are involved in designing the spring arrangement in a manner which allows, without too much technical involvement, adjustment of the height of the seat, the inclination of the seat forwardly and to the side, and the seat position along the longitudinal axis of the vehicle.

It is an object of the invention to provide a seat spring arrangement which allows for all of the mentioned possibilities of adjustment through simple means. This problem has been solved in that the parallelogram-type spring arrangement is provided with one single parallelogram lever that is mounted in a housing and resiliently supported relative thereto. This basic concept gives a spring arrangement that is both space- and material-saving, wherein each of the aforementioned adjustments is made possible, with the help of a few technical devices.

For a standard embodiment, there is excellently suited a pipe that is rigid to torsional forces and has provided on its respective ends bearing housings to receive one swing lever, each, that are interconnected via the parallelogram lever extending through the pipe, wherein the one of said levers is rigidly mounted to the vehicle, while the other one thereof is connected to the seat cup. The necessary spring resistance is simply achieved by the fact that the parallelogram lever supports on one of its ends on the main housing, in axial direction with progressive characteristic, through a set of cup- or disc-type springs.

Another advantageous spring suspension is achieved by connecting at least one of the swing levers with a torsion-bar spring that is held against rotation with one of its ends on the bearing housing and with the other end in a supporting tube being rigid to torsional forces and receiving the spring, wherein said supporting tube forms the pivotal axis of the spring lever and is preferably provided with devices for fastening of a seat cup or for mounting to a vehicle.

With this arrangement an adjustment in the spring tension is obtained by supporting the torsion-bar spring on the bearing housing via worm gear and worm shaft. The respective angle position of the torsion-bar spring, and consequently the pre-set tension thereof, is marked with the help of an indicator provided at the end of said bar that extends laterally through the housing.

It is advantageous that the swing levers are seated on a shaft in the bearing housing, wherein the shaft laterally extends through and out from this housing and is provided at its respective ends with serrations for fastening the seat cup (saddle) or for mounting to the vehicle, respectively. With the help of this toothing it is possible to adjust the correct normal position of the parallelogram-type spring arrangement and the most convenient forward inclination of the seat cup, in a very simple manner. From this basic position adjustment the height of the seat may be adjusted with the help of the adjusting nut provided at the face of the pipe, within a certain range.

A particular good dampening effect is achieved by providing the parallelogram bar with a displacement piston operating in a space defined by said bar and the main housing. The space may then be filled with oil or a polymer wherein the polymer is hydrostatically compressible and serves both as a spring and as a dampening material.

The invention is illustrated in more detail hereinafter with the help of diagrammatic drawings, and of different embodiments, wherein:

FIG. 1 is a side view of a seat of a heavy duty vehicle, wherein the seat is resiliently supported according to the invention;

FIG. 2 is a view of the seat according to FIG. 1 along the direction of the arrows II—II of FIG. 1;

FIG. 3 is a side view of the seat suspension according to FIGS. 1 and 2 on an enlarged scale;

FIG. 4 is a sectional view along the line IV—IV of FIG. 3;

FIG. 5 is a modified spring suspension system of a parallelogram-type spring arrangement according to FIGS. 1 to 4;

FIG. 6 is another embodiment of the spring suspension system for parallelogram-type spring arrangements according to FIGS. 1 to 4.

According to FIGS. 1 and 2 seat cup 1 of a heavy duty vehicle (not shown) is supported by a parallelogram-type spring arrangement according to the invention that is provided on one side of the seat and generally indicated by number 2. This arrangement has one single parallelogram lever 11 which is surrounded and spaced by a torsion resistant pipe 10, wherein the lever is hinged at its ends to swing levers 14 and 15. (In FIGS. 3 and 4 this is shown at 12 and 13). These swing levers are with their journals 16, 17 pivotally supported in the bearing housings 18, 19, that is rigidly connected to the ends of the pipe, and are with their ends extending from the bearing housings fixed, for example, against rotation forces by means of serrations 20 to a seat support 30 or to a spring suspension means 31, respectively (FIGS. 2 and 4).

Parallelogram lever 11 is supported on the side of the vehicle on a set of cup- or disc-type springs 40, with progressive characteristic, wherein the other support 41 of said springs is held axially adjustable on the end of the pipe by means of adjusting nut 42. By turning the adjusting nut the angle of swing levers 14 and 15 is changed relative to bearing housings 18 and 19, with the consequence that the height of seat cup 1 is adjusted.

If loaded, the seat cup occupies, for example the positon that is marked with dashes in FIG. 1, wherein the set of cup- or disc-type springs is compressed by the approaching of the associated end of the main housing to the adjacent end of the parallelogram lever. The use of cup- or disc-type springs is of advantage in that, in dependence upon the individual arrangement, a dampening effect may be achieved which is suited to the individual requirements.

In order to change the springing and/or dampening properties parallelogram lever 11 may be provided with a dampening piston 43 operating in oil space 44.

The housings of the swing levers that are both provided at the front and at the rear are then sealed against the oil space. Space 44 may also be filled by a polymer that is hydrostatically compressed through the action of the piston and provides both for springing and dampening. In place of the damper piston there may also be provided in space 44 a set of springs composed of cup- or disc-type springs or a normal compression spring, or of a rubbery spring. In such case the arrangement would be such that no spring 40 would be provided in front of swing lever 14.

Another embodiment in designing the spring system is illustrated in FIG. 5 showing a sectional view of bearing housing 19 corresponding to the view in FIG. 4. In this case, there is provided instead of the cup- or disc-type spring 40 that resiliently supports the parallelogram lever (shown in FIG. 3), a torsion-bar spring 90 being at the one end fixed to swing lever 15 and at the other connected to bearing housing 19 via worm 92 and worm shaft 93. The torsion-bar spring is connected to swing lever 15 through supporting tube 94 receiving said spring, wherein the spring is anchored against rotation in the end of said tube; swing lever 15 is welded to housing 94, as indicated at 96. Supporting tube 94 serves at the same time as a fastening means for the seat support, or as a part for mounting to the vehicle itself, as is indicated by tapped hole 97. The pre-tension of torsion-bar spring 90 is obtained via worm shaft 92, wherein the indication for the respective turning movements may be read from a dial of bearing housing 19 through a small indicator 98 connected to the end of the torsion-bar spring.

In the spring system according to FIG. 6, the spring means are in the form of two rubbery torsional elements 100. These rubbery elements are on the one hand connected to swing lever 15, which in the present case has a somewhat different design, and on the other with an adjusting plate 101. Swing lever 15 and adjusting plate 101 are adapted to be adjusted relative to each other by means of a screw (not shown) provided with a left-hand and a right-hand thread and fixed to bearing housing 19, in order to allow adjustment of the pre-tension of the spring. The pre-tension is adjusted, for example, through a hand wheel (not shown) that is connected to the said screw. The weight may then be indicated through a slot provided in the bearing housing, or the like, via a pin 102 that is connected to adjusting plate 101. In all of the embodiments and in the last mentioned one as well, swing lever 15 is rigidly connected to shaft 17 that is preferably provided with serrations at its respective ends.

The parallelogram-type spring arrangement according to the invention may be mounted laterally, adjacent to the seat cup, as is shown in FIG. 2 or, for example, in the center underneath of the seat cup, wherein the bottom of the seat cup is provided with a receiving section 110. The arrangement of the parallelogram-type spring arrangement in the center has the advantage of a favorable distribution of load and an effective adjustment of the transverse inclination.

The operation of the mount is self-evident from inspection of FIGURES 1 and 2. Thus: 31 is a fixed point on the body of the vehicle; 10 is the torsion resistant pipe housing parallelogram lever 11 which, as shown in FIGURE 3, moves axially with respect to the pipe 10, about 30, in the range illustrated in FIG. 1, whereby 11 compresses (downward movement) and releases (upward movement) 40, respectively. The angle at which the parallelogram lever extends upward is preset and fixed for no-load, at 31, as shown in FIGURE 1. The bar seat support 30 is connected at right angles to 10 to support the seat. When the operator sits down, the preset parallelogram lever yields to allow the seat 1 to move to the position shown in dotted lines, FIG. 1. The seat is thus resiliently mounted and can be adjusted to varying conditions. Its advantage of compactness in the parallelogram lever is self-evident.

I claim:

1. A parallelogram-type spring suspension for seats, in particular for motor-vehicle seats, comprising a seat support and a base frame:

a parallelogram lever system connecting the seat support and the base frame and comprising two parallelogram levers, an outer one formed as an oblong hollow housing and an inner one accommodated in this housing so as to be axially slidable;

two swing levers, each being connected by one of its ends to one end of the inner parallelogram lever and by its other end being pivotally mounted on the same side of the inner parallelogram lever;

two journals, each connected rigidly to the respective other end of the swing levers and by which these swing levers are mounted to the outer parallelogram lever, these two journals being rigidly connected on the outside of the other parallelogram lever to the base frame on the one hand and to the seat support on the other;

springing means provided between two parts of the parallelogram lever system which are movable relative to each other in such a manner that, upon swiveling of the outer parallelogram lever relative to the journal connected with the base frame, the springing means are loaded.

2. Parallelogram lever according to claim 1, characterized in that the springing means are disk springs disposed between the one end of the inner parallelogram lever and the adjacent end of the outer parallelogram lever, in that the outer parallelogram lever has an adjusting nut on the end supporting the disk springs, said nut constituting the one abutment of the disk springs and by which these disk springs are swivelable axially relative to the outer parallelogram lever by turning the adjusting nut.

3. Parallelogram-type spring suspension according to claim 1, characterized in that the springing means are constituted by a torsion bar, in that one of the journals is hollow and the torsion bar is disposed axially in this journal, the one end of the torsion bar being held on the outer parallelogram lever, and the other end being held in the journal.

4. Parallelogram-type spring suspension according to claim 3, characterized by a worm gear which is rigidly connected with the torsion bar end held in the outer parallelogram lever; by a worm thread which is pivotally mounted in the outer parallelogram lever and engages in the worm gear, so that the torsion bar is rotatable in relation to its end held in the journal by turning the worm thread.

5. Parallelogram-type spring suspension according to claim 1, characterized in that the springing means constitute a torsion rubber surrounding a journal with clearance and being connected at one of the front ends to the associated swing lever and being held at the other front end on the outer parallelogram lever.

6. Parallelogram-type spring suspension according to claim 1, characterized in that the outer parallelogram lever has a tubular middle portion and a bearing housing at each end of said middle portion, each bearing housing having a bearing portion extending from the central portion at right angles, in which the journals are mounted.

7. Parallelogram-type suspension for seats, in particular motor-vehicle seats, comprising a seat support and a base frame:
- a parallelogram-type lever system connecting the seat support and the base frame, said lever system consisting of two parallelogram levers, one having the shape of an oblong housing and the second being accommodated in this housing so as to be axially slidable, two swing levers which are disposed parallel to each other and are connected, within the outer parallelogram lever to the inner parallelogram lever on the one hand and on the other hand are mounted in the outer parallelogram lever;
- means for the rigid connection of the swing levers to the seat support and the base frame respectively, so that the outer parallelogram lever is swivelable against the swing lever, springing means provided between two parts of the parallelogram-type lever system which are movable in relation to each other, in such a manner that, upon swiveling of the outer parallelogram lever relative to the journal connected with the base frame, the springing means are loaded.

References Cited

UNITED STATES PATENTS

| | | | |
|---|---|---|---|
| 2,639,141 | 5/1953 | Gabriel | 248—400 X |
| 2,715,938 | 8/1955 | Miller | 248—400 X |
| 2,800,948 | 7/1957 | Omon et al. | 248—377 X |
| 2,953,191 | 9/1960 | Brendel | 248—373 |
| 3,031,164 | 4/1962 | Schopf | 248—399 |

FOREIGN PATENTS 719,590 4/1942 Germany.

ROY D. FRAZIER, *Primary Examiner.*

CHANCELLOR E. HARRIS, *Examiner.*

R. P. SEITTER, *Assistant Examiner.*